Jan. 20, 1970    EIZO GOTO ET AL    3,490,889
METHOD OF SEALING A TUBE OPENING WITH A GLASS MEMBRANE
Filed April 21, 1969    7 Sheets-Sheet 1
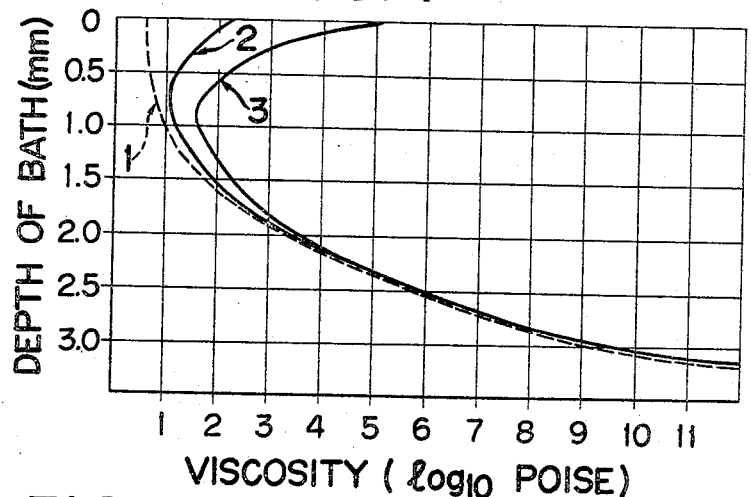
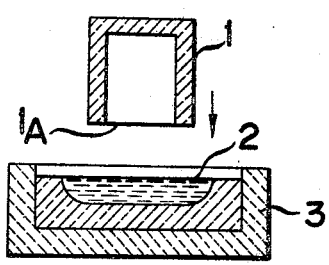
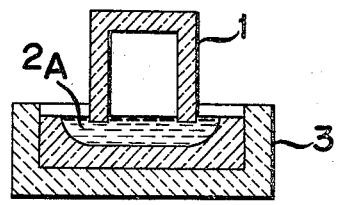
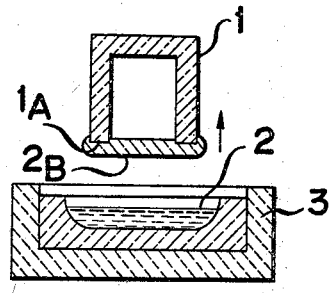
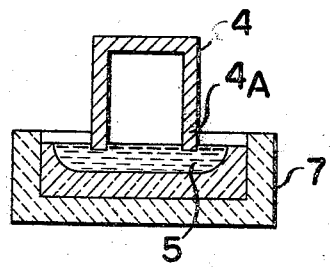
EIZO GOTO &
YONEKICHI NAKAYAMA
INVENTORS
BY Flynn & Frishauf
ATTYS

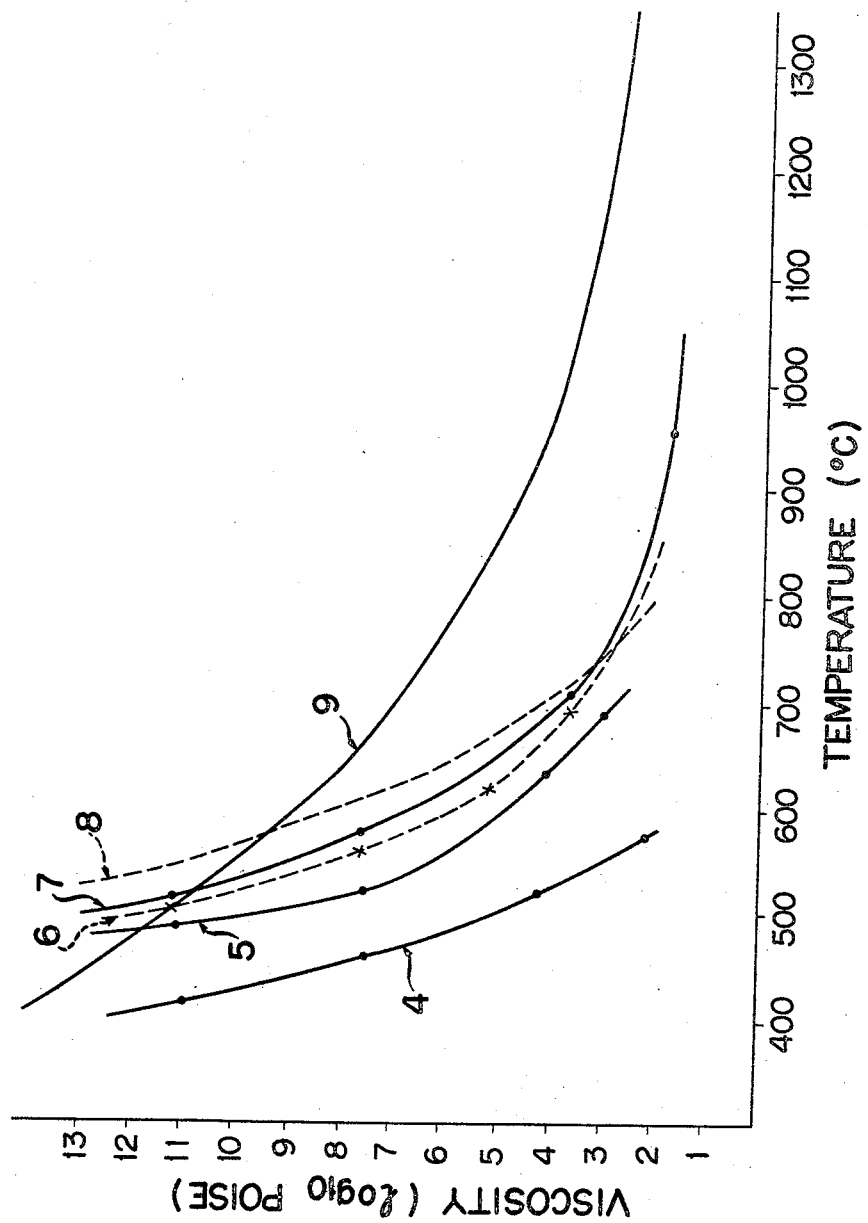

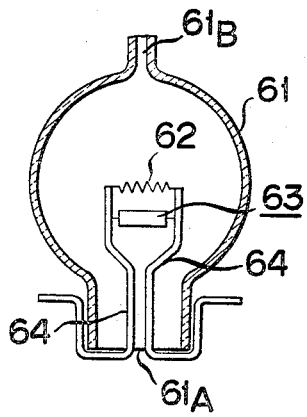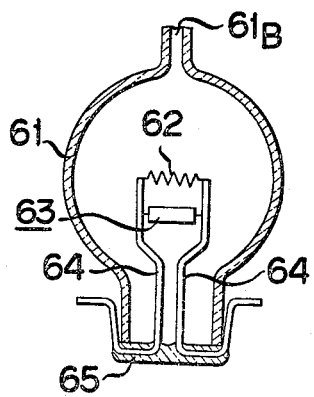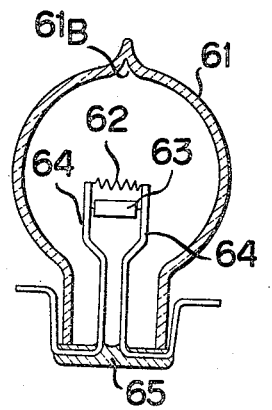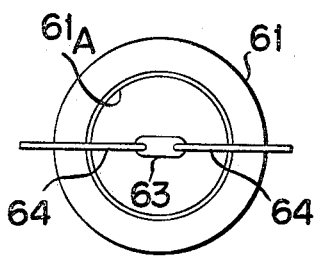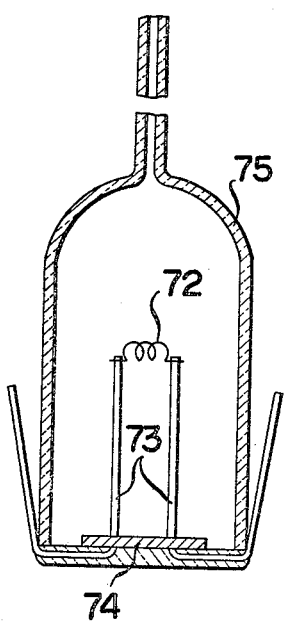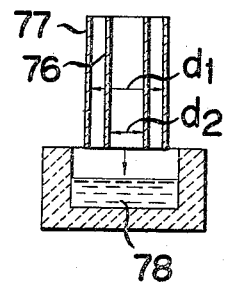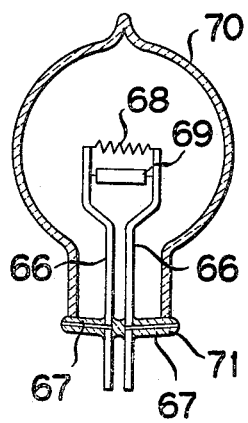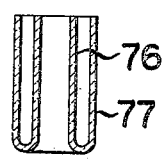

United States Patent Office 3,490,889
Patented Jan. 20, 1970

3,490,889
METHOD OF SEALING A TUBE OPENING WITH A GLASS MEMBRANE
Eizo Goto, Chigasaki-shi, and Yonekichi Nakayama, Yokohama-shi, Japan, assignors to Tokyo Shibaura Electric Co., Ltd., Kawasaki-shi, Japan, a corporation of Japan
Continuation-in-part of application Ser. No. 538,379, Mar. 29, 1966. This application Apr. 21, 1969, Ser. No. 817,858
Claims priority, application Japan, Mar. 29, 1965, 17,797/65
Int. Cl. C03c 27/06
U.S. Cl. 65—43                                            4 Claims

ABSTRACT OF THE DISCLOSURE

A method of sealing with a glass membrane an opening defined by a lip extending generally in a plane which includes forming a pool of molten glass comprising a surface layer, an intermediate layer and a bottom layer, the intermediate layer having the smallest viscosity, dipping the lip into the surface layer of the pool of molten glass and withdrawing from the pool the lip with a glass membrane adhered thereto.

CROSS-REFERENCES TO RELATED APPLICATIONS

This is a continuation-in-part of applicants' now abandoned application Ser. No. 538,379, filed on Mar. 29, 1966.

BACKGROUND OF THE INVENTION

This invention relates to a method of sealing with a glass membrane a tube opening defined by a lip generally extending in a plane.

With respect to the sealing of a tube opening, there has been known a process of dipping the opening in a pool of molten glass and, upon removal, sealing the opening with a glass membrane deposited thereon. According to this known process, however, the glass membrane sealing the tube opening trended to hang downward from the plane of the opening, assuming a lenticular or lumpy form, and in consequence failed to provide a substantially plain thin seal sheet for the opening.

SUMMARY OF THE INVENTION

It is accordingly the primary aim of the present invention to provide a method of sealing a tube opening with a substantially plain glass membrane.

Broadly speaking, the method of the present invention comprises preparing a pool of molten glass which consists of a top or surface layer having such a viscosity as displaying a full wetting property to the dipped lip of a tube opening, an intermediate layer having a smaller viscosity than the surface layer and disposed thereunder and the bottom layer having a greater viscosity than the intermediate layer and positioned thereunder, dipping the lip of the tube opening in the surface layer and removing the lip from the pool of the molten glass with a glass membrane attached to the lip and, upon removal, causing the deposited glass membrane to be solidified.

Use of a pool of molten glass consisting of the aforementioned three layers enables an approximately plain thin glass membrane to be formed in substantially the same plane as the tube opening. When the lip of the tube opening is dipped in the surface layer of the pool of molten glass, said surface layer has, as described above, a sufficient viscosity to display a full wetting property to the lip wall of the tube opening, so that said lip wall intimately contacts the pool. When the tube is lifted so as to remove the dipped lip of its opening from the pool, the molten glass of the surface layer deposited on the inner surface of the lip of the opening is gradually severed from the other glass body remaining in the pool as the opening moves upward. The intermediate layer having a smaller viscosity than the surface layer and lying thereunder plays a very important role in allowing the molten glass of the surface layer moving upward in a state attached to the lip of the tube opening to be easily separated from the remaining body of molten glass. The intermediate layer has a viscosity preferably of 100 poises, more preferably around 50 poises, which should always be lower than that of the surface layer.

Brief explanation of the drawings

FIG. 1 is a graph showing the distribution of viscosity in the vertical direction of a pool of molten glass;
FIG. 2 is a graph presenting the temperature-viscosity properties of various kinds of glass;
FIGS. 3(a) to 3(c) inclusive are schematic cross sections of a furnace and an envelope body during successive stages of one example of this invention;
FIGS. 4(a) to 4(c) inclusive are schematic cross sections of a furnace and an envelope body during successive stages of another example of this invention;
FIG. 12 is a cross section of an envelope, filament and lead wires for sealing together;
FIG. 13 is an underneath plan view of the parts shown in FIG. 12;
FIG. 14 is a cross section of the envelope, filament and lead wires shown in FIGS. 12 and 13 with a membrane formed by yet another example of this invention;
FIG. 15 is a cross section of a finished electric lamp formed by sealing the envelope of FIG. 14;
FIG. 16 is a similar view to FIG. 14 illustrating a modification of the lamp of FIG. 15;
FIG. 17 is a cross section of an electric lamp produced by yet another example of this invention;
FIGS. 18(a) and 18(b) are schematic cross sections of an envelope body and a furnace during different stages of yet another example of this invention as used to seal a multi-compartment tube.

DETAILED DESCRIPTION OF THE PREFERRED EMBODIMENTS

Figure 4B:
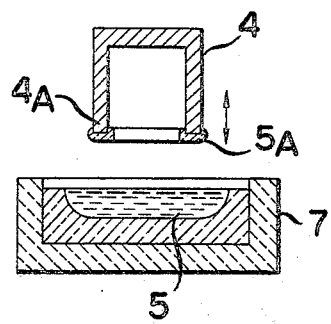

The pool of molten glass used in the method of the present invention consists of a surface layer having such a viscosity as displaying a full wetting property to the dipped lip of a tube opening, an intermeidate layer having a smaller viscosity than the surface layer and disposed thereunder and the bottom layer having a greater viscosity than the intermediate layer and positioned thereunder. The distributions of viscosity in the vertical direction of such pool are illustrated in FIG. 1. In this figure, curve 1 denotes the distribution of viscosity in a pool of molten glass immediately after completion of burner heating applied to the surface of a glass body, curve 2 represents the distribution of viscosity in said pool when it was allowed to stand in the open air about 2 minutes after heating, and curve 3 shows the distribution of viscosity in said pool when, after completion of heating, streams of air at 20° C. were allowed to flow about 2 minutes over the surface of the pool at the rate of 10 to 20 cc./sec. per 1 cm.$^2$ of said surface.

The glass constituting the aforementioned pool is preferably of the following composition:

| | Weight percent |
|---|---|
| SiO$_2$ | 31.5 |
| TiO$_2$ | 3.5 |
| Na$_2$O | 4.0 |
| B$_2$O$_3$ | 7.5 |
| ZrO$_2$ | 6.5 |
| LiO$_2$ | 1.0 |
| CdO | 3.0 |
| PbO | 43.0 |

Softening point, 520° C.

As apparent from FIG. 1, after completion of heating applied to the surface of the pool of molten glass, said surface is allowed naturally to release heat or forcibly cooled, causing said surface layer to become fairly more viscous than that immediately below. Namely, there are formed three layers of different viscosities, i.e. the surface layer having a certain degree of viscosity, the intermediate layer having the smallest viscosity and the bottom layer having the greatest viscosity.

The lip of the tube opening to be sealed with a glass membrane is dipped in the surface layer of a pool of molten glass while said surface layer still retains a viscosity falling within the range, where it can display a full wetting property to the lip wall of the tube opening, and then taken out of the pool. The molten glass of the surface layer intimately wets the walls of the lip of the tube opening while it is dipped therein. When the lip of the tube opening is taken out of the pool, the mother glass of the top phase deposited on the lip is severed from the remaining glass body in a state still attached to said lip, thus forming a glass membrane thereon. When the molten glass of the surface layer is lifted with the lip of the tube opening on which it is deposited, the intermediate layer of the pool lying immediately below the surface layer and having the smallest viscosity permits the easy removal of the surface layer from the pool so as to prevent excess amounts of the surface layer glass from being deposited on the lip and separated from the pool. The bottom layer having the greatest viscosity so acts as to pull down the intermediate layer when part of the surface layer is lifted with the tube, and also protects the bottom of a surface containing a pool of molten glass from the effect of heat.

The thickness of a glass membrane formed on the lip of the tube opening is naturally determined by the amount of glass deposited thereon. Other conditions being equal, the amount of the deposited glass depends on the depth of the surface layer of the pool. The viscosity of the surface layer is also a factor in defining the thickness of a glass membrane obtained. Namely, the greater the viscosity, the more increased is the amount of glass attached to the lip of the tube opening, resulting in the deeper thickness of a glass membrane formed. The upper limit to said viscosity is regulated by the required property of displaying a wetting property to the wall surface of the lip of the tube opening. While said upper limit somewhat varies with the material of the tube, it will generally range between 10$^2$ to 10$^4$ poises. In practice, a pool having such range of viscosity presents a full wetting property to tubes made of a large variety of materials.

As apparent from the foregoing description, the intermediate layer of a pool is preferred to have the smallest possible viscosity, regardless of all other conditions involved. Said viscosity should preferably be 100 poises maximum, particularly around 50 poises. If there is presented in the interface between the top and intermediate layer a sharp change of viscosity, it will also play an important role in facilitating the separation of part of the surface layer from the remaining glass body when it is taken out of the pool with the lip of the tube opening on which it is deposited. From this point of view, a pool having a viscosity distribution denoted by the curve 3 of FIG. 1 is more preferred than that of the curve 2.

A pool of molten glass having the aforesaid preferred viscosity distribution may be prepared from any known material. Obviously, however, the more sensitive to temperature change is the viscosity of glass material, the greater will be the advantage offered by use of said material in forming a pool having a desired viscosity distribution. The temperature-viscosity properties of some typical glass materials are presented in FIG. 2. The curves 4 to 9 of FIG. 2 represent the properties of glass materials having the compositions listed below:

4

| | Weight percent |
|---|---|
| PbO | 66.0 |
| B$_2$O$_3$ | 19.5 |
| ZnO | 11.5 |
| SiO$_2$ | 2.0 |
| Al$_2$O$_3$ | 1.0 |

5

| | |
|---|---|
| PbO | 66.2 |
| B$_2$O$_3$ | 15.1 |
| Al$_2$O$_3$ | 9.7 |
| SiO$_2$ | 8.5 |
| LiO$_2$ | 0.2 |
| NaF | 0.3 |

6

| | |
|---|---|
| SiO$_2$ | 31.5 |
| TiO$_2$ | 3.5 |
| Na$_2$O | 4.0 |
| B$_2$O$_3$ | 7.5 |
| ZrO$_2$ | 6.5 |
| LiO$_2$ | 1.0 |
| CdO | 3.0 |
| PbO | 43.0 |

7

| | |
|---|---|
| SiO$_2$ | 34.0 |
| B$_2$O$_3$ | 7.0 |
| ZrO$_2$ | 6.0 |
| LiO$_2$ | 1.0 |
| CdO | 3.0 |
| PbO | 44.0 |

8

| | Weight percent |
|---|---|
| $V_2O_5$ | 10.0 |
| $B_2O_3$ | 30.0 |
| ZnO | 55.0 |
| $SiO_2$ | 5.0 |

9

| | |
|---|---|
| $SiO_2$ | 56.0 |
| $Al_2O_3+Fe_2O_3$ | 2.5 |
| PbO | 29.0 |
| $Na_2O$ | 4.5 |
| $K_2O$ | 8.0 |

It is only when a force of gravity applied to a glass membrane deposited on the lip of a tube opening is smaller than a surface tension prevailing in said membrane that it can assume a substantially plain form. Namely, the thickness of a plain glas membrane formed on the lip of a tube opening having a given opening area is subject to a certain limit corresponding to said opening area. Within the range of operating temperature used in practice, the surface tension and density of molten glass are substantially fixed. Accordingly, no matter how other conditions are varied, the lip of a tube opening having a larger diameter than a certain limit fails to allow the formation of a plain glass membrane. Experiments show that where the lip of a tube opening has an annular form, 30 mm. is deemed an upper limit to the diameter permitting the formation of a plain glass membrane on the lip.

As previously described, the thickness of a glass membrane deposited on the lip of a tube opening substantially depends on the depth of the surface layer of a pool. Accordingly, if the depth of the surface layer is adjusted to meet the diameter of the lip of a tube opening to be sealed, then there can be formed a glass membrane having a desired thickness.

The materials of a tube which can be sealed by the method of the present invention include glass, metals and ceramics. Obviously, the tube should be made of a material having a sufficiently high melting or softening point so as to be prevented from becoming substantially soft when exposed to the temperature of the surface layer of a pool. Since, however, the time required for the lip of a tube opening to be dipped in a pool of molten glass is relatively short, for example, 10 seconds max. or sometimes 2 to 3 seconds, any tube prepared from a material having a slightly higher melting or softening point than the temperature of the top phase of the pool permits the formation of a glass membrane on the lip of its opening.

To describe the invention more concretely, a tube may be formed of any of the glass materials having the aforementioned compositions, if a pool consists of a glass material having a certain lower softening point than that of the tube material. The tube may be prepared from metallic material used in ordinary glass seal, such as pure iron, alloys of 29.5% Ni-5.8% Co-64.7% Fe, those of 48% Ni-52% Fe or those of 42% Ni-5.8% Cr-52.2% Fe. The ceramics usable in the fabrication of a tube include porcelains of forsterite, alumina and steatite, etc. Whatever material is used in making a tube, it is preferred that said material should have a coefficient of linear expansion approximating that of the glass of a pool as much as possible. Selection of such tube materials will be apparent to those skilled in the art.

There will now be described the concrete examples of the present invention. Throughout the examples, the molten glass used was controlled in temperature so as to have a viscosity distribution denoted by the curve 2 or 3 of FIG. 1 or that similar thereto. In some of the examples, a pool was heated by a suitable source of heat, for example, a burner, starting with the surface. Upon completing of heating, the lip of a tube opening was dipped in the top phase of the pool. In other examples, there were disposed a pair of electrodes in that part of a pool which formed an intermediate phase. This phase was heated by current travelling across the electrodes, and the top phase was either allowed naturally to cool or forcibly cooled.

Referring now to FIGS. 3(a) to 3(c) inclusive of the accompanying drawings, an envelope body 1 having an opening $1_A$ to be sealed with a planar glass membrane is made of glass. The envelope body has a hollow cylindrical or tubular configuration having a diameter of about 7 mm. and a thickness of about 0.5 mm., the tubular body having an open end or ends. The glass employed to form the tubular body 1 has a softening point of 630° C. and a coefficient of linear expansion of $$96 \times 10^{-7} cm./°C.$$

at temperatures of from 100 to 300° C. A pool of molten glass 2 is provided for forming a glass membrane on the body 1 by a dip seal process. The glass in the pool 2 contained in a trough 3 has a softening point of 520° C. and a coefficient of linear expansion of $99 \times 10^{-7} cm./°$ C. at temperatures ranging from 100 to 300° C. The pool of molten glass 2 may be obtained by melting at high temperatures powdered glass or a mass of thick plate glass by subjecting it to a gas flame. A surface layer of the pool 2 is heated to 1200° C. to have a viscosity of 50 poises.

When the heating of the molten glass is stopped, the tubular body 1 is moved from the position shown in FIG. 1(a) to that shown in FIG. 1(b) to dip the lip of the opening $1_A$ into the surface layer $2_A$ of the pool of molten glass. After a short interval, the tubular body 1 is lifted to withdraw the opening $1_A$ from the molten glass pool 2 with a glass membrane $2_B$ of generally uniform thickness adhering to the lip of the opening $1_A$ as shown in FIG. 3(c).

Figure 4C:
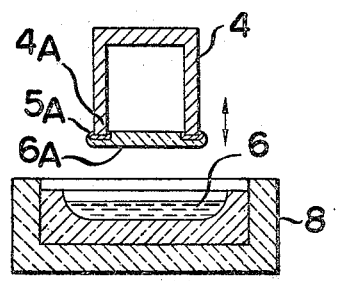

The embodiment illustrated in FIGS. 4(a) to 4(c) inclusive is particularly applicable where the tubular body is made of metallic material. The body 4 shown in FIG. 2 is a metal tube formed of, for example, an alloy of iron, nickel and cobalt or an iron-chrome alloy. A planar opening $4_A$ of the body 4 is dipped into a pool 5 of molten glass of low viscosity in a furnace 7, as shown in FIG. 4(a), and withdrawn from the pool 5 after a short period of time, as shown in FIG. 4(b). An annular glass coating $5_A$ is formed on the lip of the opening as shown in FIG. 4(b). In this case, care should be taken to terminate the welding of the molten glass 5 onto the metallic body 4 within the shortest possible period of time by heating the molten glass to as high a temperature as possible. If the temperature of the glass is too low, the temperature of the end of the body 4 at the edge of the opening $4_A$ rises slowly, because the body 4 has high thermal conductivity, and it takes a longer period to achieve glass welding, giving a risk that the body 4 may be eroded undesirably by the glass material. It would be difficult to attach a membrane to the opening $4_A$ of the body 4 from low viscosity, glass from the pool 5, but the edge of the opening $4_A$ can readily be coated with an annular layer of glass.

However the annular coating enhances the weldability of a hollow body, and hence is particularly useful as a preliminary step in a dip seal process where the weldability is poor.

As shown in FIG. 4(c), the lip of the opening $4_A$ with its coating $5_A$ is then dipped into a pool of molten glass 6 in a furnace 8, and after a short period withdrawn from the pool with a glass membrane $6_A$ adhering to the coating $5_A$, molten glass being a material identical with or similar to that of the pool 5.

The product obtained will have no undesirable deformation due to softening, or other undesirable distortion since almost no heat is transferred to parts other than the lip of the opening and it is possible to seal in the tubular body thermally vulnerable inserts, such as semiconductive elements or photoconductive elements, while avoiding overheating of the elements. Moreover, the tubular body can be miniaturized without overheating faults being caused by the proximity of the insert and the sealed opening. Moreover the glass sealing membrane can be made flat to reduce operational difficulties due to refraction or scattering effects, and the membrane can be used as an optical window.

Low melting point glasses other than soda glass and potash glass can be used. For instance, lead glass low melting point can be used, and a glass having as major constituents $SiO_2$, $B_2O_3$, and PbO. The glass may be pigmented or otherwise coloured, and then the glass membrane obtained will serve as a filter which has particular use if a photoconductive cell is housed in the tubular body.

Figure 5:
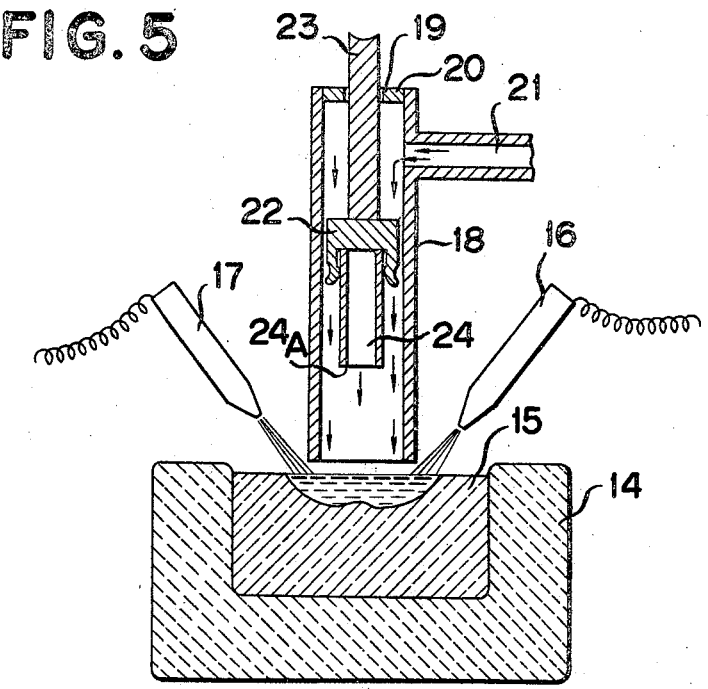
FIG. 5 is a schematic cross section of a furnace which can be used in this invention.

Referring now to FIG. 5 one furnace suitable for use in a dip seal process comprises a crucible 14 made of laminated bricks, and provided with a glass receiving portion in which powdered glass material 15 is placed. Above the opening of the furnace 14, a positive arc electrode 16 is positioned at one side of said opening and a negative arc electrode 17 is placed at the opposite side, the front ends of said electrodes 16 and 17 being directed towards the central surface portion of the glass material 15. A hollow cylindrical guide pipe 18 extends vertically upwards from the central surface portion of the glass material 15 with a small gap therebetween. The upper end of the hollow cylindrical guide pipe 18 is sealed with a plate 20 having a perforation 19. The guide pipe 18 also communicates with a conduit 18 at its upper portion. A holder 23 extends through the perforation 19 for vertical movement, the holder 23 being provided with nippers 22 at its lower end and being connected at its upper end to a driving means (not shown) for displacing the holder vertically.

When the electrodes 16 and 17 are connected to a source of electric power (not shown), current passes between the electrodes 16 and 17 through the shortest path through the glass material 15 generating heat by resistance heating mainly in a surface region of the glass material 15 to form a pool of molten glass. Nitrogen is supplied through the conduit 21 and the pipe 18. After the heating is stopped, the body 24 to be sealed placed in the holder 23 is lowered until the lip of the opening $24_A$ to be sealed dips into the surface portion of the molten glass body. The nitrogen introduced into the pipe 18 through the conduit 21 serves to protect the tubular body and also to clean the gas generated from the surface of the body of molten glass.

With this furnace, the upper portion of the pool of molten glass is at a high temperature owing to the action of the electric current passing between the electrodes, and has a decreased viscosity, but the layer closest to the surface of the molten glass has a viscosity higher than the immediately underlying portion due to heat radiation to the atmosphere. Thus the furnace is particularly applicable to the dip glass sealing process. Since the glass material in the furnace is only partly melted, corrosion of the furnace may be minimized so that the admixture of impurities into the molten glass pool is reduced.

The process illustrated in FIG. 6 is a method of making a sintered cadmium sulphide photoconductive cell device. A tubular body 25 is first formed by cutting a length of glass tube with open ends. A photoconductive element 26 is supported on a mount 30 by support members 27, which consist of a pair of easily bendable metallic supporting legs $27_A$ and a pair of considerably thick or supporting legs $27_B$ on which are mounted the supporting legs $27_A$. The tubular body 25 may for example be made by cutting a tube of potash lead glass having an outer diameter of 7 mm. and a thickness of 0.5 mm. in length of 8 mm. and coating the cut pieces with glaze. The photoconductive element 26 may be prepared by sintering a photoconductive layer onto a steatite base having a diameter of 5 mm. and a thickness of 1 mm. and by depositing metal, such as indium onto the layer by vacuum vapour deposition to form a counter electrode. The base is provided with holes having diameters of 0.6 mm., to which the supporting legs 27 are connected through eyelets of nickel. The support members $27_A$ may be of thin nickel wire of diameter 0.1 mm. and of length 5 mm., and the supporting legs $27_B$ may be of core wire of Ni-Fe alloy which is coated with copper to have a diameter of 0.4 mm., which in turn is treated with nickel coating. The mount 30 is also provided with a glass bead 31 which is secured to the support members 27, and which has a diameter of 3 mm. and a length of 2 mm. The glass bead 31 is secured to the supporting legs $27_B$ 1.5 mm. from the ends nearer the element 26.

Figure 6A:
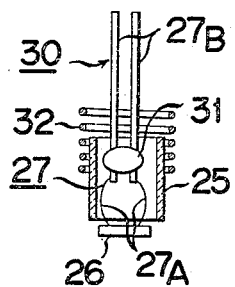
FIGS. 6(a) to 6(f) inclusive are schematic cross sections of a photoconductive cell, a glass envelope and a furnace during successive stages of yet another example of this invention.
Figure 6B:
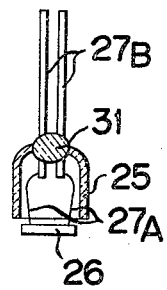
Figure 6C:
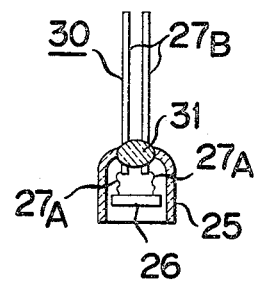
Figure 6D:
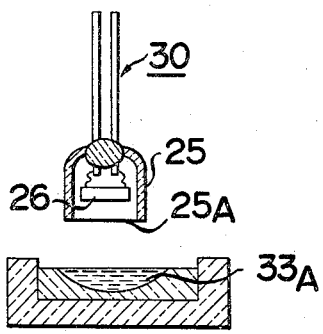
Figure 6E:
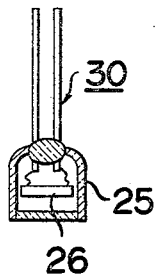
Figure 6F:
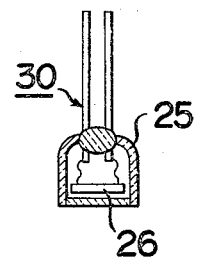

The mount 30 is inserted in the body 25 and then the upper end of the body 25 is heated and fused by a heater 32 and is hermetically welded to the glass bead 31, as shown in FIGS. 6(a) and 6(b). The supporting legs $27_A$ are substantially straight and the mount is positioned remote from the region where heat is applied, at the bead 31, and outside the tubular body 25. The photoconductive element 26 is then pushed into the tubular body 25 by distorting the supporting legs $27_A$, as shown in FIG. 6(c). The envelope is then sealed by a dip sealing process the planar lip of the opening $25_A$ being dipped in a surface layer of a pool of molten glass $33_A$ in the furnace 33 for less than 1 second, as shown in FIG. 6(d) to seal the photoconductive element 26 within the tubular body 25, with a glass membrane as shown in FIG. 6(e). If necessary, the position of the photoconductive element 26 in the envelope can be adjusted for instance to that shown in FIG. 6(f), by applying a mechanical shock to the envelope after sealing.

In this process the supporting legs $27_A$ play an important role. The first function of the legs $27_A$ is to prevent the photoconductive element 26 from being heated when the end of the tubular body 25 is welded to the bead glass. The heat applied to the photoconductive element during the welding operation may include, other than the radiant heat emitted from the welded-sealed portion, heat passed by thermal conduction through the lead wires to the element. If the amount of thermal conduction is large, not only may the temperature of the photoconductive element be raised unduly so that the characteristics of the element deteriorate but also the electrical connections may be excessively heated, giving poor electrical contact.

The lead wire serving as the supporting legs $27_A$ preferably has a diameter of only 0.1 mm., while the supporting legs $27_B$ preferably have a diameter of 0.4 mm., so that it is possible to greatly decrease the amount of thermal conduction. Moreover during the welding and sealing of the glass bead and the tubular body, temperature effects are reduced by keeping the photoconductive element away from the heating portion.

The second function of the supporting legs $27_A$ resides in protecting the photoconductive element from thermal and mechanical shocks to which the element is particularly sensitive; for instance if the electrodes and the lead wires are connected with a silver paste or an indium welding material.

When the membrane is formed, the period for which the open end $25_A$ of the tubular body 25 is dipped into a body of molten glass is less than one second. Therefore, even if the photoconductive element 26 is positioned within the tubular body at a place relatively close to the opening, and hence to the molten glass, thermal effects upon the element can be sufficiently reduced. Since the element 26 can also be pushed into the tubular body 25 nearer the bead 31, by bending the supporting legs $27_A$, the envelope constituted by the tubular body 25 and the glass membrane may be greatly miniaturized when compared with previous envelopes. The gap between the glass surface and the photoconductive surface of the element 26 may be suitably about 2 mm.

Figure 7:
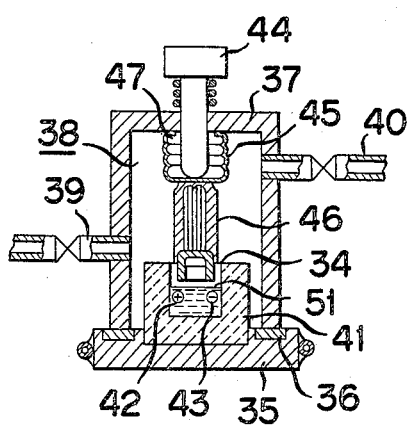
FIG. 7 is a cross section of yet another example of a furnace used in this invention.

The furnace shown in FIG. 7 is intended to enable the shape of the glass membrane to be made uniformly flat by controlling the atmosphere outside the tubular body 34 and also to enable different desired gases to be sealed in the envelope consisting of the tubular body 34 and the glass membrane, simultaneously with the sealing operation. The device comprises a water-cooled base plate, upon which is mounted a packing 36 on which a bell-jar is in turn secured to form a sealed vessel or envelope 38. The bell-jar 37 is connected at opposite sides to inlet and outlet conduits 39 and 40 for introducing gas and controlling the atmosphere in the bell-jar. A glass fusing crucible 41 made for example of refractory bricks is housed in the sealed vessel 38. In the crucible 41 are mounted electrodes 42 and 43 made of molybdenum. A glass material is loaded in the crucible 41 and, by passing electrical current through the electrodes 42 and 43, is melted. Above this glass melting crucible 41 is positioned a tubular body 34 which is to be sealed to form an envelope. More particularly, the tubular body 34 is attached to an operating mechanism 47 which comprises a push button 44 penetrating through the bell-jar 37, bellows 45 and a holder 46 supported by the push button through the bellows.

Figure 8A:
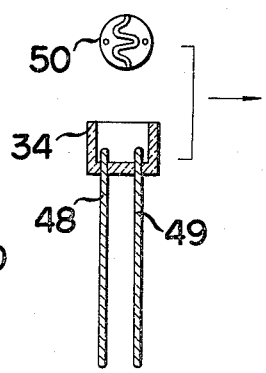
FIGS. 8(a) to 8(d) inclusive are schematic cross sections of a photoconductive cell, a glass envelope and a furnace during successive stages of yet another example of this invention.
Figure 8B:
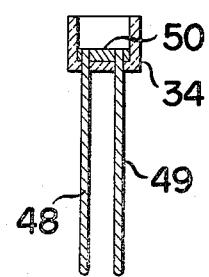

The operation of the device will be described with reference to a method of sealing, a photosensitive element in a glass envelope. As shown in FIG. 8(a), the body 34, which is cup-shaped here, has lead wires 48 and 49 sealed therethrough. A photosensitive element 50 is positioned in the body 34 in a manner shown in FIG. 8(b). A glass material of low melting point whose coefficient of expansion is approximately equal to that of the body material is placed in the glass melting crucible 41 shown in FIG. 5 and melted by passing an electrical current between electrodes 42 and 43 to obtain molten glass of a viscosity less than 50 poises. Then, the body 34 carrying the photosensitive element 50 is connected to the holder 46 of the operative mechanism 47 so that the circular opening of the body 34 is directed downwards and is placed in the vessel 38, which is then supplied with the desired atmosphere, for instance an inert gas or purified air.

Figure 8C:
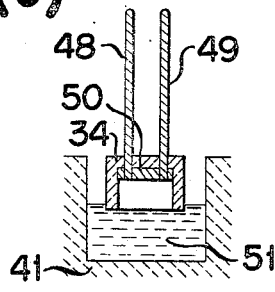
Figure 8D:
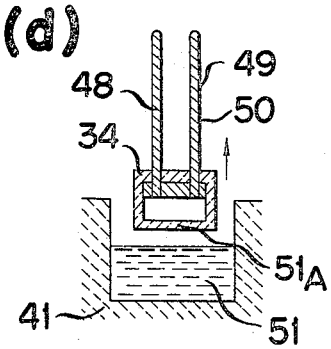

The push button is then operated to lower the body 34 and dip the circular lip of the body into the pool of molten glass to a depth of 0.2 mm. to 0.1 mm., as shown in FIG. 8(c). After increasing the pressure within the vessel 38 to correspond to that in the body 34, the push button 44 is then released to lift the lip of the body 34 up to a position 2 to 5 mm. above surfaces of the molten glass body, so that the envelope is tightly sealed by a membrane of molten glass adhering to the lip of the opening by the dip sealing process. Regulating the pressure of the environment at the time of lifting is important since the pressure within the body 34 increases due to the rise in temperature when it is dipped in the molten glass so that a flat membrane would not be formed with a compensatory increase in external pressure and moreover it is most probable that the membrane would be broken after the body is drawn out without giving a completed seal. When the dipping operation is finished, the external pressure may be increased by 100 mm. Hg and then periodically slightly increased and decreased to assist welding of the glass material. A device of the kind referred to in connection with FIG. 4 can also be made by this method.

Figure 9A:
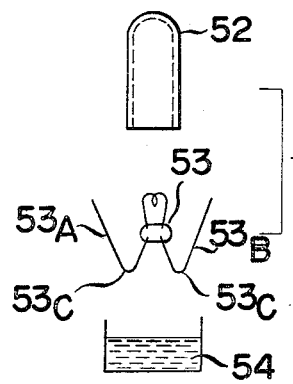
FIGS. 9(a) to 9(c) inclusive are schematic representations of a filament, lead wires, an envelope and a furnace during successive stages of yet another example of this invention.
Figure 9B:
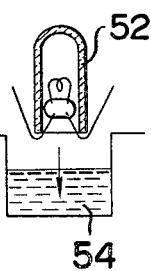
Figure 9C:
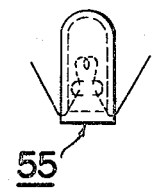

FIGS. 9(a) to 9(c) illustrate a method of forming a seal for an incandescent lamp by a dip seal process. As shown in FIG. 9(a), a mount 53 is to be inserted in a hollow cylindrical body 52 having a transparent end. The body is placed in the sealed vessel shown in FIG. 7. The vessel is first evacuated and then filled with a controlled atmosphere of argon or nitrogen. The circular opening of the body 52 is then dipped into a body of molten glass 54 heated, for example, to 1200° C., as shown in FIG. 9(b) to effect a dip seal as shown in FIG. 9(c), where the completed lamp is shown at 55. In this case, lead wires $53_A$ and $53_B$ for the mount 53 are bent to form bent portions $53_C$, which are positioned adjacent the edge of the opening when the mount 53 is inserted in the body 53, and embedded in the periphery of the membrane during the welding process. This method enables an envelope for an incandescent lamp to be produced without the necessity for an exhaust pipe. Moreover the time required for making the dip seal is only 5 seconds, which is one tenth of the minimum period required in conventional methods and automation should further reduce the time needed.

Figure 10:
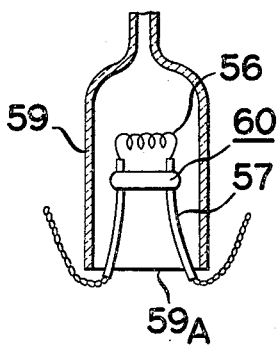
FIG. 10 is a cross section of an envelope, a filament and lead wires for sealing together.
Figure 11:
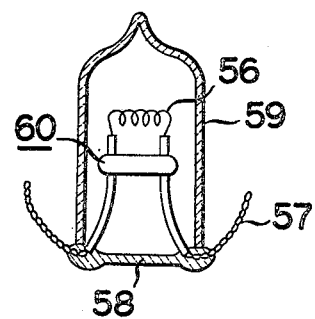
FIG. 11 is a cross section of the envelope shown in FIG. 10 after sealing by yet another example of this invention.

The incandescent lamp illustrated in FIGS. 10 and 11 is a modification of the one shown in FIG. 9(c) wherein supporting legs 57 supporting a filament 56 are respectively formed of twisted wires. As the supporting legs 57 also serve as lead wires, twisted wires of sufficient flexibility are used to avoid cracking the membrane 58, the membrane 58 is formed by a dip seal process on the lip of the opening $59_A$ in a glass body 59. Each of the supporting legs 57 is formed by twisting together seven strands each having a diameter of 0.1 mm., and each of the twisted wires is bent in U-shape at periphery of the opening $59_A$. The filament 56 is secured to the envelope by means of a mount 60. The supporting legs 57 may be formed alternatively by arranging strands in parallel with each other, or by coiling a single strand with a plurality of parallel strands.

The formation of a glass membrane for a glass envelope by this invention as shown in FIGS. 12 to 15 is intended to produce a further modified lamp. A pair of supporting legs 64 are provided to support a filament 62 and a filament mount 63 within a glass body 61. The legs 64 are shaped so that portions of the legs extend from a common central region of the opening $61_A$ outwardly in opposite directions where a membrane 65 is to be formed, and then bent to lie along the outer surface of the envelope. The supporting legs 64 form lead wires, and also serve to reinforce the glass membrane formed. FIG. 14 illustrates a finished incandescent lamp wherein an exhaust port $61_B$ provided in a body 61 is sealed by welding after exhausting gas from the envelope 61. The envelope 61 comprises a membrane 65 formed by a dip seal process.

In a modification shown in FIG. 16 the functions of supporting the filament and mount and of reinforcing the membrane are carried out by separated lead wires 66 which extend straight through the central portion of the membrane 71, and have reinforcing members 67 extending parallel to the membrane. The bulb is shown at 70, and the filament and mount at 68 and 69 respectively.

In a further modification shown in FIG. 17 a disk 74 is provided to reinforce the membrane. A pair of supporting legs 73 which carry a filament 72 extend through the disk and are shaped to extend outwardly from a common central region of the open end of a bulb 75. The disk 74 is embedded in the glass membrane during the dip seal process. The spacing between the periphery of the disk and the edge, annular opening of the body 75 is small so that formation of the glass surface in the reduced opening is easier. This enables larger openings in the bulb 75 to be sealed by the dip seal process, than would otherwise be possible, the supporting legs 73 in this modification also serve as lead wires.

FIGS. 18(a) and 18(b) illustrate a dip sealing process as applied to sealing a multi-compartment tube, where it is deisred to seal an opening only between coaxial inner and outer tube portions 76 and 77, leaving a central coplanar, of the inner tube portion 76. If the following inequality is satisfied, the viscosity of the molten glass 78 in the dip seal process can be chosen so that a membrane is formed between the inner and outer tubes 76 and 77, but any membrane formed within the inner tube 76 is broken by surface tension forces before it hardens:

$$d_2 > \tfrac{1}{2}(d_1 - d_2)$$

Where $d_1$ is the diameter of this outer tube 77, and $d_2$ is the diameter of the inner tube 76.

Figure 19:
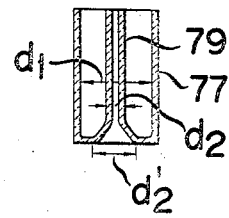
FIG. 19 is a cross section of another multi-compartment tube sealed by using yet another example of this invention.
Figure 20:
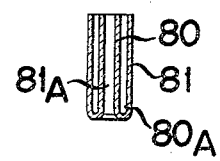
FIG. 20 is a schematic cross section of yet another multi-compartment tube sealed by this invention.

As shown in FIG. 19 even if the diameter of the inner tube 79 is insufficient to satisfy this in equality, the end portion of the tube can be enlarged so that the lip of the inner tube 79 dipped in the molten glass has a sufficiently large diameter.

In the method illustrated in FIGS. 18(a) and 18(b), a membrane is formed on the coplanar openings $80_A$, $81_A$ of both inner and outer tubes 80 and 81, by a dip seal process and the central glass surface portion is later broken by melting it with a gas burner to obtain an article having a central perforation therein.

Figures 22A, 22B:
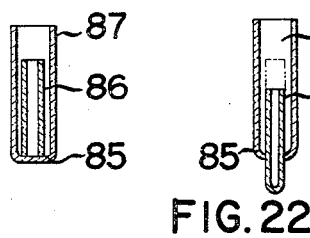
FIGS. 22(a) and 22(b) are views similar to FIGS. 18(a) and 18(b) for another example of this invention to seal a multi-compartment tube.

An embodiment shown in FIGS. 22(a) and 22(b) explains an additional step to be carried out after the formation of a glass membrane by the method shown in FIGS. 18(a) and 18(b). As shown in these figures, after glass membrane 85 is formed on the lips of the inner and outer tubes 86 and 87, the inner tube 86 is moved along the axis thereof while the glass membrane has a viscosity of $10^3$ to $10^{11}$ poises, so as to shift the relative positions shown in FIG. 22(b). The double compartment tube thus obtained has bottoms of different levels.

Figure 21:
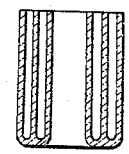
FIG. 21 is a schematic cross section of yet another example of a multi-compartment tube sealed by this invention.

As shown in FIG. 21 the methods are applicable to a triple compartment tube.

The coaxial openings need not be coplanar in the finished article. As shown in FIGS. 22(a) and 22(b) after the ends of the multi-compartment tubes are withdrawn from the molten glass with an adherent membrane or membranes, and before the glass of the membrane hardens the inner and outer tubes can be displaced longitudinally relative to each other. Suitably the viscosity of the glass of the membrane while the tubes are being relatively displaced is between $10^3$ and $10^4$ poises.

Multi-compartment tubes can be sealed by a dip seal process not only where their cross section is circular but also for other various cross sections such as oval and rectangular, and it will be appreciated that the dip seal process simplifies the sealing of such relatively complicated structures.

FIGS. 23(a) to 23(e) inclusive illustrate a method of sealing a body 82 having relatively a large annular opening by the dip seal process.

Figure 23A:
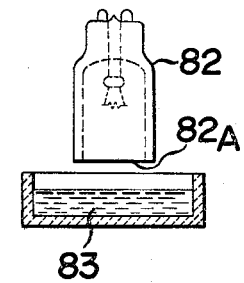
FIGS. 23(a) to 23(e) inclusive are schematic cross sections of an envelope body and a furnace during successive stages of yet another example of this invention.
Figure 23B:
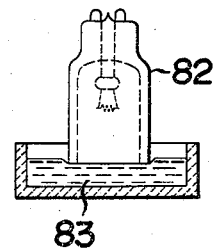
Figure 23C:
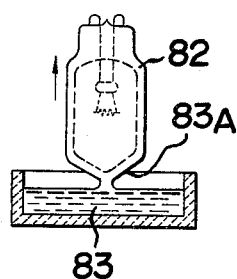
Figure 23D:
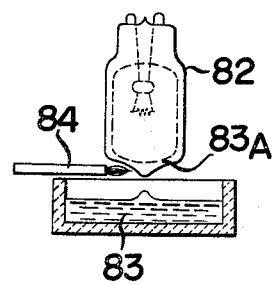
Figure 23E:
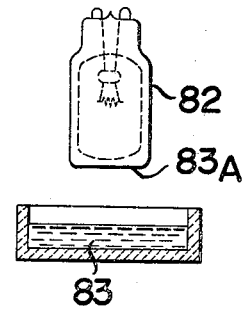

When the opening $82_A$ of the body 82 is dipped into a body of molten glass 83 as shown in FIGS. 23(a) and 23(b) and then withdrawn after less than one second with an adherent membrane $83_A$, the central portion of the membrane hangs down, to an extent depending on for instance the viscosity of the glass surface and the diameter of the annular opening of the body. In this method the hanging portion of the glass surface $83_A$ is subsequently heated by a gas burner, as shown in FIG. 23(d) to render the surface of the glass membrane flatter and more uniform as shown in FIG. 23(e). There is little risk that the use of the gas burner will contaminate the gas within the envelope as the sealing and welding operation is completed first.

What is claimed is:

1. A method of sealing with a glass membrane a tube opening defined by a lip extending generally in a plane which comprises forming a pool of molten glass consisting of a surface layer having a sufficient viscosity to display a full wetting property to the lip of the opening dipped in said pool, an intermediate layer having a smaller viscosity than the surface layer and disposed thereunder and a bottom layer having a greater viscosity than the intermediate layer and positioned thereunder, dipping the lip of the tube opening in the surface layer, removing the dipped lip from the pool of molten glass with a glass membrane deposited thereon and thereafter causing the glass membrane to be solidified.

2. A method according to claim 1 wherein the surface layer has a viscosity ranging between $10^2$ and $10^4$ poises and the intermediate layer has a viscosity of approximately 50 poises.

3. A method according to claim 1 wherein the surface of the pool is cooled by contact with air streams.

4. A method according to claim 1 wherein the intermediate layer is heated by current travelling therethrough from electrodes disposed therein.

References Cited

UNITED STATES PATENTS 3,288,901    11/1966    Clark _____ 264—171 X

FOREIGN PATENTS 569,150    5/1945    Great Britain.
593,866    3/1960    Canada.

S. LEON BASHORE, Primary Examiner

R. L. LINDSAY, Jr., Assistant Examiner

U.S. Cl. X.R.

65—45, 58, 59; 264—271, 272